United States Patent
Si et al.

(10) Patent No.: US 11,509,444 B2
(45) Date of Patent: Nov. 22, 2022

(54) METHOD FOR RECEIVING APERIODIC TRACKING REFERENCE SIGNAL AND TERMINAL

(71) Applicant: VIVO MOBILE COMMUNICATION CO., LTD., Guangdong (CN)

(72) Inventors: Ye Si, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 77 days.

(21) Appl. No.: 17/092,097

(22) Filed: Nov. 6, 2020

(65) Prior Publication Data

US 2021/0058215 A1 Feb. 25, 2021

Related U.S. Application Data

(63) Continuation of application No. PCT/CN2019/085983, filed on May 8, 2019.

(30) Foreign Application Priority Data

May 9, 2018 (CN) .......................... 201810438201.8

(51) Int. Cl.
*H04L 5/00* (2006.01)
*H04W 72/04* (2009.01)
*H04W 80/02* (2009.01)

(52) U.S. Cl.
CPC .......... *H04L 5/0085* (2013.01); *H04L 5/0051* (2013.01); *H04W 72/042* (2013.01); *H04W 72/0453* (2013.01); *H04W 80/02* (2013.01)

(58) Field of Classification Search
CPC ... H04L 5/0096; H04L 5/0085; H04L 5/0094; H04L 5/006; H04L 5/0051; H04L 5/0053;

(Continued)

(56) References Cited

U.S. PATENT DOCUMENTS

2017/0142751 A1 5/2017 Liu et al.
2018/0007731 A1 1/2018 Park et al.
(Continued)

FOREIGN PATENT DOCUMENTS

CN 104105132 A 10/2014
CN 105323811 A 2/2016
(Continued)

OTHER PUBLICATIONS

CN Office Action in Application No. 201810438201.8 dated Apr. 29, 2020.
Written Opinion and International Search Report in Application No. PCT/CN2019/085983 dated Nov. 19, 2020.
"Discussion on DCI related issues" Qualcomm Incorporated, 3GPP TSG RAN WG1 Meeting AH 1801, R1-1800870, Jan. 22, 2018.
"Analysis of periodic vs aperiodic TRS" Ericsson, 3GPP TSG RAN WG1 Meeting #92bis, R1-1804988, Apr. 16, 2018.
(Continued)

*Primary Examiner* — Shukri Taha
(74) *Attorney, Agent, or Firm* — Maschoff Brennan

(57) ABSTRACT

A method for receiving an aperiodic tracking reference signal and a terminal are provided. The method includes: receiving downlink control information, where the downlink control information includes information used for triggering an aperiodic tracking reference signal in a secondary cell; receiving the aperiodic tracking reference signal in the secondary cell based on the downlink control information; and if a validation condition of the aperiodic tracking reference signal is met, determining that the aperiodic tracking reference signal is valid, where the validation condition includes at least that a receiving moment of the aperiodic tracking reference signal is after completion of radio frequency retuning between the terminal and the secondary cell.

15 Claims, 9 Drawing Sheets

(58) Field of Classification Search
CPC .... H04L 5/0048; H04L 5/0023; H04W 76/27; H04W 72/046; H04W 16/28; H04W 80/08; H04W 8/02; H04W 72/042; H04B 7/0695; H04B 7/0413
See application file for complete search history.

(56) References Cited

U.S. PATENT DOCUMENTS

| | | | | |
|---|---|---|---|---|
| 2019/0116012 | A1* | 4/2019 | Nam | H04L 5/0096 |
| 2019/0215117 | A1* | 7/2019 | Lee | H04L 5/0082 |
| 2019/0260447 | A1* | 8/2019 | Nam | H04L 27/2655 |
| 2019/0312614 | A1* | 10/2019 | Kim | H04W 72/14 |
| 2019/0335427 | A1* | 10/2019 | Sun | H04B 7/0626 |
| 2020/0146107 | A1* | 5/2020 | Xiong | H04W 76/27 |
| 2020/0305232 | A1* | 9/2020 | Miao | H04B 1/38 |

FOREIGN PATENT DOCUMENTS

| | | |
|---|---|---|
| CN | 107211296 A | 9/2017 |
| CN | 107786313 A | 3/2018 |

OTHER PUBLICATIONS

MediaTek Inc., Remaining issues on TRS, 3GPP TSG-RAN WG1 Meeting #92, R1-1801670, pp. 1-7, (Feb. 26, 2018).
Qualcomm Incorporated, "NR SCell activation timeline," 3GPPRAN4#86, R4-1803037, pp. 1-6, (Feb. 26, 2018).
Vivo, "Remaining issues on TRS," 3GPP TSG-RAN WG1 NR #92bis, R1-1803826, pp. 1-3, (Apr. 16, 2018).
CATT, Further discussion on SCell activation and deactivation requirements, 3GPP TSG-RAN4 Meeting #86bis, R4-1803710, pp. 1-5, (Apr. 16, 2018).
Huawei et al., Further discussion on introducing aperiodic TRS, 3GPP TSG RAN WG1 Meeting #92bis, R1-1804443, pp. 1-3, (Apr. 16, 2018).
MediaTek Inc., "Summary #2 for TRS," 3GPP TSG-RAN WG1 Meeting #92bis, R1-1805694, pp. 1-4, (Apr. 16, 2018).
Vivo, Remaining issues on TRS, 3GPP TSG-RAN WG1 NR #93, R1-1806053, pp. 1-3, (May 21, 2018).
Extended European Search Report dated May 31, 2021 as received in Application No. 19800430.1.

* cited by examiner

METHOD FOR RECEIVING APERIODIC TRACKING REFERENCE SIGNAL AND TERMINAL

CROSS-REFERENCE TO RELATED APPLICATIONS

This application is continuation application of PCT International Application No. PCT/CN2019/085983 filed on May 8, 2019, which claims priority to Chinese Patent Application No. 201810438201.8 filed in China on May 9, 2018, the disclosures of which are incorporated in their entireties by reference herein.

TECHNICAL FIELD

Some embodiments of this disclosure relate to the field of wireless communications technologies, and in particular, to a method for receiving an aperiodic tracking reference signal and a terminal.

BACKGROUND

In the future fifth Generation (5G) mobile communications system, to improve reliability of the system, a frequency offset, a time offset, a Doppler shift, a Doppler spread, and a delay spread of the system need to be accurately estimated based on a reference signal. In addition, a new type of reference signal, namely a tracking reference signal (TRS), is introduced to reduce overheads and avoid presence of reference signals (such as a cell reference signal (CRS)) that occupy more time-frequency resources. A receive end can accurately estimate a channel parameter based on the TRS to improve demodulation accuracy.

In order to improve the spectrum efficiency and meet the demand of higher peak rate, the carrier aggregation technology is proposed. Carrier aggregation is aggregation of two or more component carriers (CC) to support a greater transmission bandwidth. Actually, each carrier cell corresponds to an independent cell. Cells in carrier aggregation can be divided into a primary cell (PCell) and a secondary cell (SCell). The primary cell is a cell in which a terminal (UE) establishes initial connection, and is responsible for radio resource control (RRC) communication with the UE. The secondary cell is added during RRC reconfiguration, and is used to provide additional radio resources. There is no RRC communication between the secondary cell and the UE. The primary cell of the UE is always in an active state, not supporting activation and deactivation. The secondary cell needs to be activated and deactivated. Activation and deactivation need to be executed by using media access control (MAC) control element (CE) signaling.

During activation of the secondary cell, when a periodic TRS is configured for time-frequency tracking on the secondary cell, if the periodic TRS has been received before the MAC CE signaling becomes valid, it is necessary to wait until a next TRS period (a maximum delay may reach up to one TRS period) to receive the TRS and perform time-frequency tracking on a downlink channel of the secondary cell, thereby causing resource wastes.

SUMMARY

Some embodiments of this disclosure provide a method for receiving an aperiodic tracking reference signal and a terminal, so as to resolve a problem of resource wastes due to poor flexibility in time-frequency tracking on a secondary cell by using a periodic TRS.

In order to resolve the foregoing technical problem, this disclosure is implemented as follows:

According to a first aspect, some embodiments of this disclosure provide a method for receiving an aperiodic tracking reference signal, applied to a terminal. The method includes:

receiving downlink control information, where the downlink control information includes information used for triggering an aperiodic tracking reference signal in a secondary cell;

receiving the aperiodic tracking reference signal in the secondary cell based on the downlink control information; and if a validation condition of the aperiodic tracking reference signal is met, determining that the aperiodic tracking reference signal is valid, where the validation condition includes at least that a receiving moment of the aperiodic tracking reference signal is after completion of radio frequency retuning between the terminal and the secondary cell.

According to a second aspect, some embodiments of this disclosure provide a terminal, including:

a first receiving module, configured to receive downlink control information, where the downlink control information includes information used for triggering an aperiodic tracking reference signal in a secondary cell;

a second receiving module, configured to receive the aperiodic tracking reference signal in the secondary cell based on the downlink control information; and a processing module, configured to: if a validation condition of the aperiodic tracking reference signal is met, determine that the aperiodic tracking reference signal is valid, where the validation condition includes at least that a receiving moment of the aperiodic tracking reference signal is after completion of radio frequency retuning between the terminal and the secondary cell.

According to a third aspect, some embodiments of this disclosure provide a terminal, including a processor, a memory, and a computer program stored in the memory and capable of running on the processor. When the computer program is executed by the processor, the steps of the method for receiving an aperiodic tracking reference signal described above are implemented.

According to a fourth aspect, some embodiments of this disclosure provide a computer-readable storage medium. The computer-readable storage medium stores a computer program, and when the computer program is executed by a processor, the steps of the method for receiving an aperiodic tracking reference signal are implemented.

In some embodiments of this disclosure, the aperiodic tracking reference signal is used to perform time-frequency tracking on the secondary cell. The aperiodic tracking reference signal can be triggered based on a requirement, which resolves a problem of poor flexibility of a periodic tracking reference signal. In addition, a receiving moment of a usable aperiodic tracking reference signal is definite, so that time-frequency tracking on the secondary cell can be performed based on the usable aperiodic tracking reference signal, which improves communication accuracy and efficiency.

BRIEF DESCRIPTION OF DRAWINGS

Other advantages and benefits will become apparent to those of ordinary skill in the art by reading detailed description of the optional embodiments below. The accompanying drawings are merely intended to illustrate the objectives of the optional embodiments and are not intended to limit this disclosure. Throughout the accompanying drawings, the same reference numerals represent the same components. In the drawings.

DESCRIPTION OF EMBODIMENTS

The following clearly describes the technical solutions in some embodiments of this disclosure with reference to the accompanying drawings in some embodiments of this disclosure. Apparently, the described embodiments are a part rather than all of the embodiments of this disclosure. All other embodiments obtained by a person of ordinary skill in the art based on the embodiments of this disclosure without creative efforts shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates that the following three cases: only A is included, only B is included, or both A and B are included.

In some embodiments of this disclosure, the words "for example" or "such as" are used to represent an example, an illustration, or a description. Any embodiment or design solution described as "as an example" or "for example" in some embodiments of this disclosure should not be construed as preferred or advantageous over other embodiments or design solutions. To be precise, the terms, such as "as an example" or "for example", are intended to present a related concept in a specific manner.

The following describes the embodiments of this disclosure with reference to the accompanying drawings. A method for receiving an aperiodic tracking reference signal and a terminal that are provided in some embodiments of this disclosure may be applied to a wireless communications system. The wireless communications system may be a 5G system, an evolved long term evolution (eLTE) system, or a subsequent evolved communications system.

Figure 1:
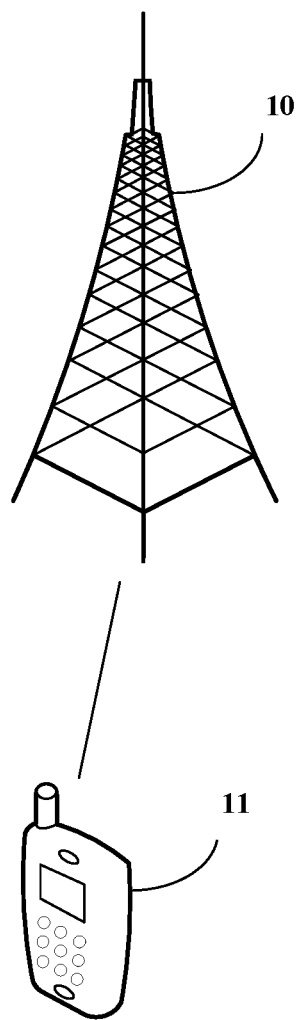
FIG. 1 is a schematic architectural diagram of a wireless communications system according to this disclosure.
Figure 2:
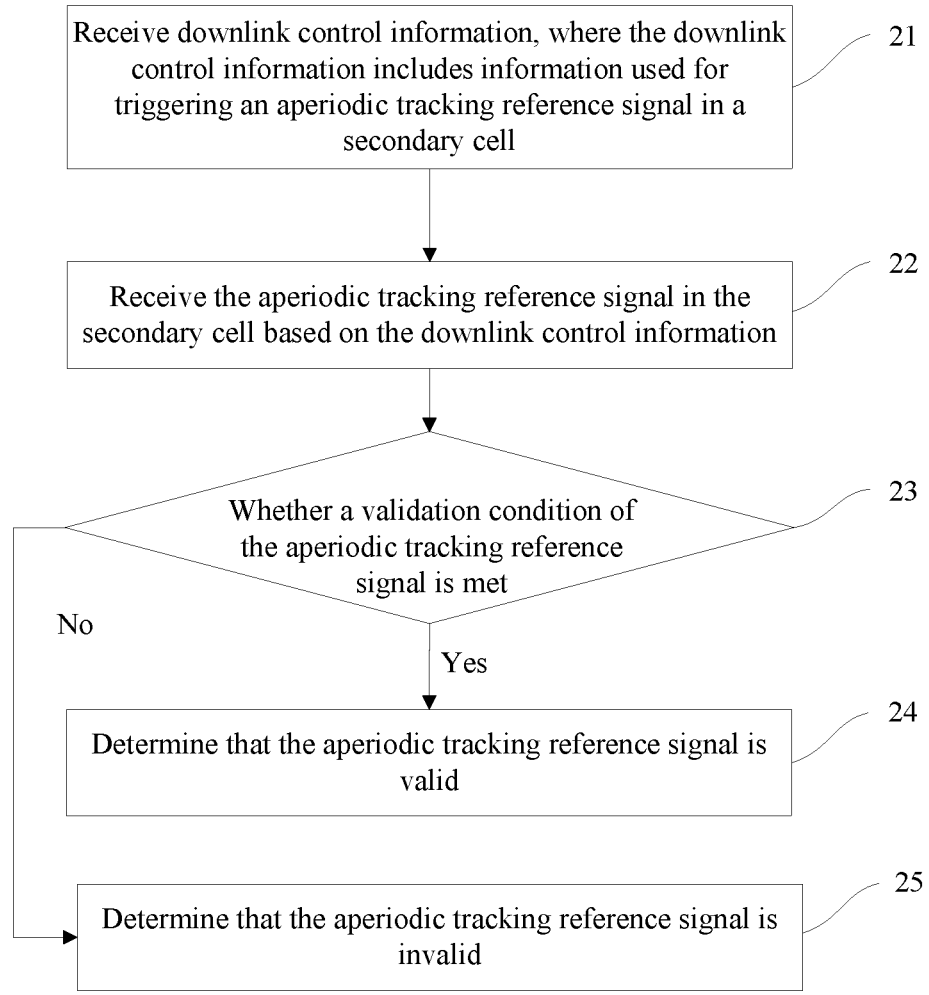
FIG. 2 is a schematic flowchart of a method for receiving an aperiodic tracking reference signal according to this disclosure.

FIG. 1 is a schematic architectural diagram of a wireless communications system according to some embodiments of this disclosure. As shown in FIG. 1, the wireless communications system may include a network-side device 10 and a terminal, for example, the terminal is denoted by UE11. The UE11 may be connected to the network-side device 10. In an actual application, connection between the foregoing devices may be wireless connection. To conveniently and intuitively represent a connection relationship between the devices, a solid line is used in FIG. 1.

It should be noted that the foregoing communications system may include a plurality of UEs, and the network-side device may communicate with the plurality of UEs (transmitting signaling or data).

The network-side device 10 provided in some embodiments of this disclosure may be a base station, and the base station may be a commonly used base station, or may be an evolved base station (eNB), or may be a device in the 5G system, such as a network-side device (such as a next-generation base station (gNB) or a transmission and reception point (TRP)) or a cell, or may be a network-side device in a subsequent evolved communications system. The term does not constitute any limitation thereon.

The terminal provided in some embodiments of this disclosure may be a mobile phone, a tablet computer, a notebook computer, an ultra-mobile personal computer (UMPC), a netbook, a personal digital assistant (PDA), or the like. Persons skilled in the art can understand that the term does not constitute any limitation thereon.

FIG. 1 is a schematic flowchart of a method for receiving an aperiodic tracking reference signal according to this disclosure. The receiving method is applied to a terminal and includes the following steps.

Step 21: Receive downlink control information, where the downlink control information includes information used for triggering an aperiodic tracking reference signal in a secondary cell.

In some embodiments of this disclosure, the aperiodic tracking reference signal in the secondary cell may be triggered by a CSI request field (CSI request field) in DCI Format 0-1.

In some embodiments of this disclosure, the secondary cell may be in same-carrier scheduling or cross-carrier scheduling. If the secondary cell is configured as a self-scheduling cell (cell), both control information and data information of the secondary cell are transmitted in the secondary cell. If the secondary cell is configured with cross-carrier scheduling, the control information of the secondary cell is transmitted in other cells (such as the primary cell) and the data information is transmitted in the secondary cell. Therefore, the downlink control information in some embodiments of this disclosure may be received in the primary cell or in the secondary cell.

Step 22: Receive the aperiodic tracking reference signal in the secondary cell based on the downlink control information.

In some embodiments of this disclosure, the aperiodic tracking reference signal are transmitted on a physical downlink shared channel (PDSCH).

Step 23: Determine whether a validation condition of the aperiodic tracking reference signal is met. If yes, proceed to step 24; otherwise, proceed to step 25. The validation condition includes at least that a receiving moment of the aperiodic tracking reference signal is after completion of radio frequency retuning between the terminal and the secondary cell.

In some embodiments of this disclosure, completion of radio frequency retuning between the terminal and the secondary cell refers to a moment at which radio frequency retuning is completed between the terminal and the secondary cell.

Step 24: If the validation condition of the aperiodic tracking reference signal is met, determine that the aperiodic tracking reference signal is valid.

Step 25: If the validation condition of the aperiodic tracking reference signal is not met, determine that the aperiodic tracking reference signal is invalid.

That the aperiodic tracking reference signal is valid means that the aperiodic tracking reference signal is usable, that is, can be used for time-frequency tracking on the secondary cell. That the aperiodic tracking reference signal is invalid means that the aperiodic tracking reference signal is not usable, that is, cannot be used for time-frequency tracking on the secondary cell.

Radio frequency retuning means that after a transmit end transmits a modulated signal, a receive end makes a receiver resonate with the signal to achieve an optimal signal receiving effect. At that time, the signal receiving effect is the best, with relatively small spurious-wave interference.

To be specific, the terminal does not expect to receive the aperiodic tracking reference signal before completing radio frequency retuning with the secondary cell, because the signal received by the terminal before completion of radio frequency retuning with the secondary cell is not satisfactory, with relatively large spurious-wave interference. After completion of radio frequency retuning with the secondary cell, the signal received by the terminal is good, and the received aperiodic tracking reference signal may be used as a usable aperiodic tracking reference signal;

otherwise, the received aperiodic tracking reference signal is used as an unusable aperiodic tracking reference signal.

At present, the aperiodic tracking reference signal has been agreed upon at the 3GPP RAN1 92bis meeting. In a frequency range 2, supporting the aperiodic tracking reference signal is an optional terminal function. The terminal does not expect triggering of an aperiodic tracking reference signal unless an associated periodic TRS with the same impulse (burst) length has been configured on the same BWP for the terminal. Impulse (burst) may be called a burst. The aperiodic tracking reference signal has the same bandwidth, symbol position, subcarrier position, and burst length as the associated periodic TRS. A quasi-collocation (QCL) relationship between the aperiodic tracking reference signal and the associated periodic TRS is QCL type A+D.

In some embodiments of this disclosure, the aperiodic tracking reference signal is used to perform time-frequency tracking on the secondary cell, and the aperiodic tracking reference signal is triggered by using the downlink control information. Therefore, the UE can receive the aperiodic tracking reference signal in a timely manner and perform time-frequency tracking on the secondary cell, without the need to wait for arrival of the next period as that for the periodic TRS, which resolves a problem of poor flexibility of a periodic tracking reference signal. In addition, a receiving moment of a usable aperiodic tracking reference signal is definite, so that time-frequency tracking on the secondary cell can be performed based on the usable aperiodic tracking reference signal, which improves communication accuracy and efficiency.

Figure 3:
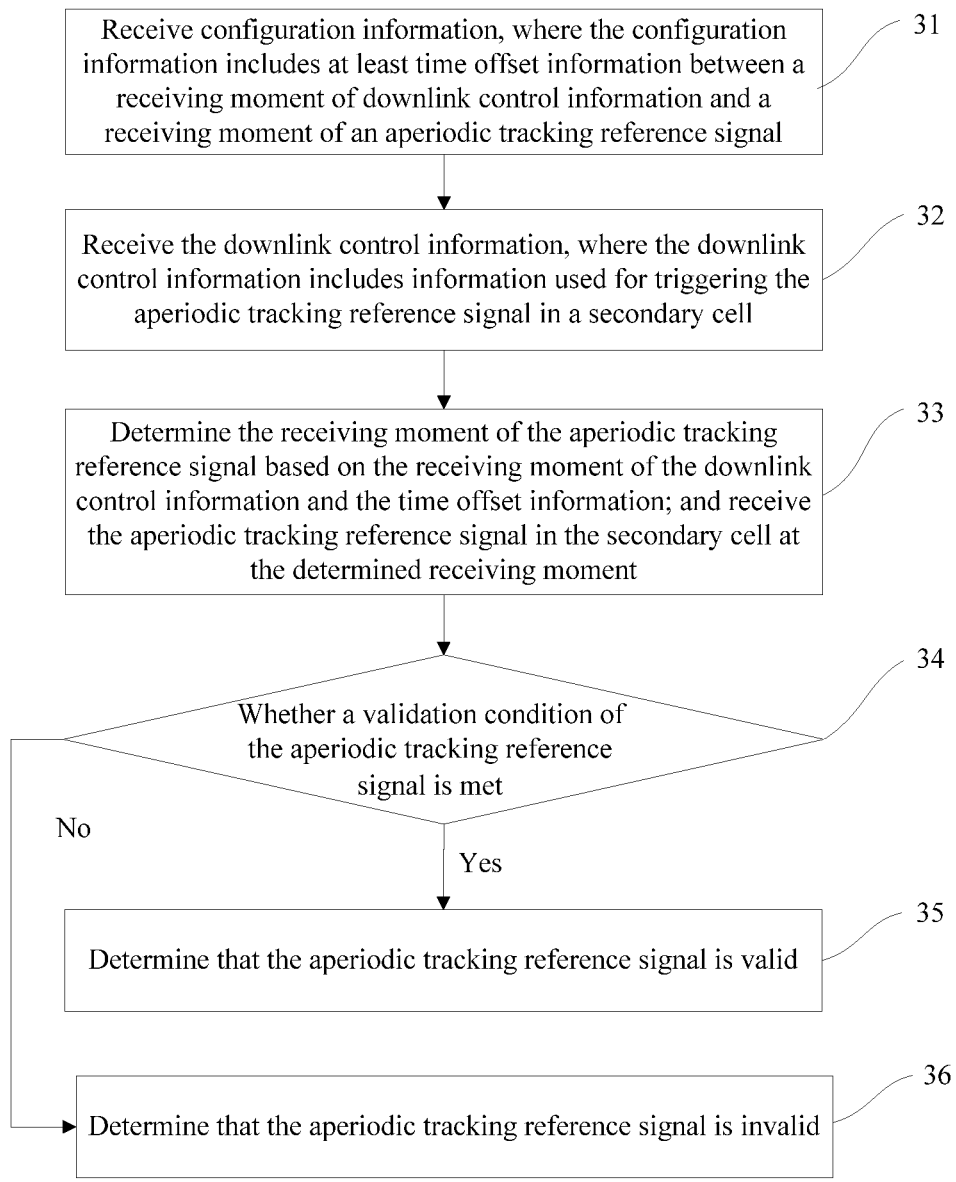
FIG. 3 is another schematic flowchart of a method for receiving an aperiodic tracking reference signal according to this disclosure.

FIG. 3 is another schematic flowchart of a method for receiving an aperiodic tracking reference signal according to this disclosure. The receiving method is applied to a terminal and includes the following steps.

Step 31: Receive configuration information, where the configuration information includes at least time offset information (A-TRS time offset) between a receiving moment of downlink control information and a receiving moment of the aperiodic tracking reference signal.

In some embodiments of this disclosure, a network-side device may send the configuration information by using RRC signaling, and the configuration information may further include information such as a bit quantity of the aperiodic tracking reference signal in a secondary cell and/or a frequency domain location of the aperiodic tracking reference signal.

Step 32: Receive the downlink control information, where the downlink control information includes information used for triggering the aperiodic tracking reference signal in the secondary cell.

Step 33: Determine the receiving moment of the aperiodic tracking reference signal based on the receiving moment of the downlink control information and the time offset information; and receive the aperiodic tracking reference signal in the secondary cell at the determined receiving moment.

Step 34: Determine whether a validation condition of the aperiodic tracking reference signal is met. If yes, proceed to step 35; otherwise, proceed to step 36. The validation condition includes at least that the receiving moment of the aperiodic tracking reference signal is after completion of radio frequency retuning between the terminal and the secondary cell.

Step 35: If the validation condition of the aperiodic tracking reference signal is met, determine that the aperiodic tracking reference signal is valid.

Step 36: If the validation condition of the aperiodic tracking reference signal is not met, determine that the aperiodic tracking reference signal is invalid.

In some embodiments of this disclosure, based on the receiving moment of the downlink control information and the time offset information that is between the receiving moment of the downlink control information and the receiving moment of the aperiodic tracking reference signal and that is carried in the received configuration information, the receiving moment of the aperiodic tracking reference signal can be determined, so as to accurately receive the aperiodic tracking reference signal.

In the foregoing embodiment, the receiving moment of the aperiodic tracking reference signal is used as a condition for determining whether the received aperiodic tracking reference signal is valid. In some other embodiments of this disclosure, the receiving moment of the downlink control information may also be used as another condition for determining whether the received aperiodic tracking reference signal is valid.

That is, the validation condition may alternatively be that the receiving moment of the downlink control information is after a preset moment.

In some optional embodiments of this disclosure, the preset moment may be one of the following moments:

(1) a receiving moment of MAC CE signaling, where the MAC CE signaling includes instruction information used for activating the secondary cell;

(2) a sending moment of acknowledgement signaling, where the acknowledgement signaling is used for confirming reception of the MAC CE signaling;

(3) a validation moment of the MAC CE signaling; and (4) a completion moment of radio frequency retuning between the terminal and the secondary cell.

Certainly, in some other embodiments of this disclosure, the preset moment may alternatively be another moment.

In addition, in some other embodiments of this disclosure, the receiving moment of the downlink control information may not be used as a condition for determining whether the received aperiodic tracking reference signal is valid, that is, the downlink control information corresponding to the usable aperiodic tracking reference signal may be received at any time. However, in this case, the terminal does not perform any operation, such as a handover operation of the secondary cell or a radio frequency retuning (RF retuning) operation o the secondary cell, on the secondary cell based on the received downlink control information.

With reference to specific embodiments, the following describes in detail the method for receiving an aperiodic tracking reference signal in this disclosure.

EXAMPLE 1

Figure 4:
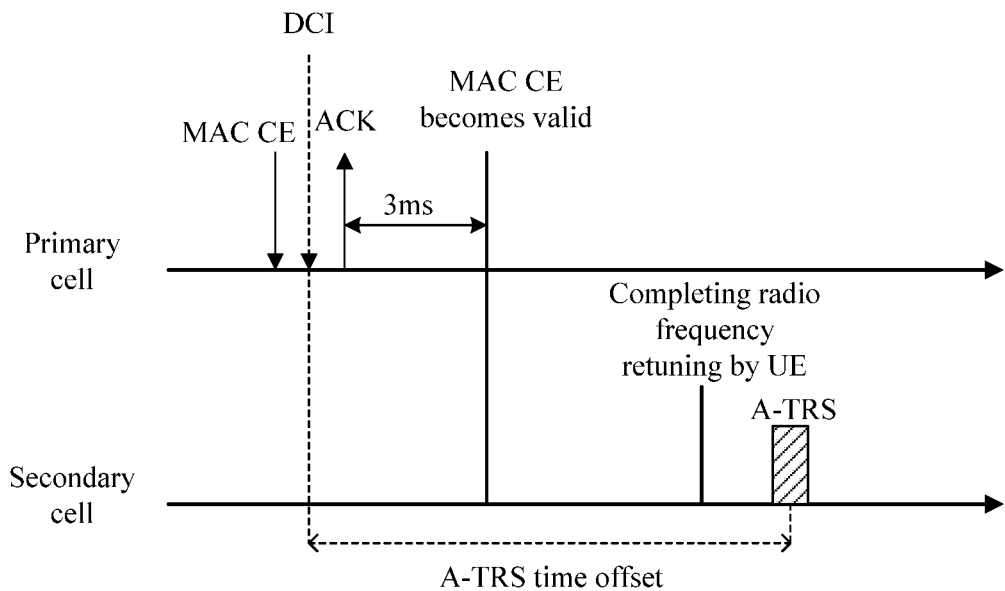
FIG. 4 is a schematic flowchart 1 of a receiving moment of an aperiodic tracking reference signal according to this disclosure.

Referring to FIG. 4, the method of receiving an aperiodic tracking reference signal in Example 1 of this disclosure includes the following steps.

Step 41: The terminal receives MAC CE signaling (activation Command) in a primary cell, where the MAC CE signaling includes instruction information used for activating a secondary cell.

On a network-side device corresponding to the primary cell, the network-side device generates the MAC CE signaling at a MAC layer, where the MAC CE signaling includes the instruction information used for activating the secondary cell, the MAC layer packages and sends the MAC CE signaling to a physical layer, and the physical layer transmits the MAC CE signaling on a PDSCH.

After receiving physical layer information sent by the network-side device, the terminal performs processes such as channel estimation, equalization, or decoding, to correctly receive the physical layer information.

Step 42: The terminal receives downlink control information (DCI), where the downlink control information includes information used for triggering the aperiodic tracking reference signal in the secondary cell, and a receiving moment of the downlink control information (DCI trigger timing) is after a receiving moment of the MAC CE signaling.

For example, the network-side device corresponding to the primary cell sends the downlink control information to the terminal based on a sending moment of the downlink control information. The terminal blindly detects and receives the downlink control information.

In some embodiments of this disclosure, the terminal does not expect to receive the downlink control information before the receiving moment of the MAC CE signaling. If the terminal receives the downlink control information before the receiving moment of the MAC CE signaling, it is determined that the received aperiodic tracking reference signal is invalid. If the terminal receives the downlink control information after the receiving moment of the MAC CE signaling, it is determined that the received aperiodic tracking reference signal is valid.

Step 43: The terminal sends acknowledgement (ACK) signaling, where the acknowledgement signaling is used for confirming reception of the MAC CE signaling.

After correctly receiving the physical layer information sent by the network-side device, the terminal sends the ACK signaling to the network-side device.

Step 44: After the MAC CE signaling becomes valid (MAC CE message is applied), the terminal starts to activate the secondary cell.

The protocol stipulates that there is 3 ms between sending of ACK signaling by the terminal and a validation time of the MAC CE signaling. After the MAC CE signaling becomes valid, the secondary cell starts to be activated, that is, the terminal starts radio frequency retuning with the secondary cell.

Step 45: The terminal completes radio frequency retuning with the secondary cell.

Step 46: The terminal receives the aperiodic tracking reference signal in the secondary cell based on the received downlink control information and a time offset between the receiving moment of the downlink control information and the receiving moment of the aperiodic tracking reference signal.

Step 47: The terminal determines whether a validation condition of the aperiodic tracking reference signal is met. If yes, proceed to step 48; otherwise, proceed to step 49. The validation condition includes that the receiving moment of the downlink control information (DCI trigger timing) is after the receiving moment of the MAC CE signaling, and that the receiving moment of the aperiodic tracking reference signal is after completion of radio frequency retuning between the terminal and the secondary cell.

Step 48: If the validation condition of the aperiodic tracking reference signal is met, determine that the aperiodic tracking reference signal is valid.

Step 49: If the validation condition of the aperiodic tracking reference signal is not met, determine that the aperiodic tracking reference signal is invalid.

EXAMPLE 2

Figure 5:
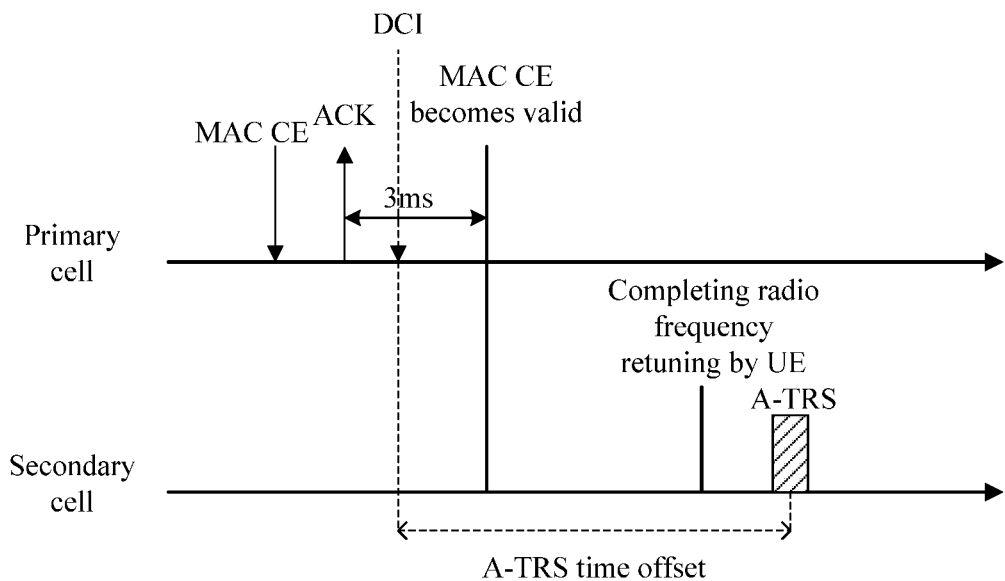
FIG. 5 is a schematic flowchart 2 of a receiving moment of an aperiodic tracking reference signal according to this disclosure.

Referring to FIG. 5, the method of receiving an aperiodic tracking reference signal in Example 2 of this disclosure includes the following steps.

Step 51: The terminal receives MAC CE signaling (activation Command) in a primary cell, where the MAC CE signaling includes instruction information used for activating a secondary cell.

On a network-side device corresponding to the primary cell, the network-side device generates the MAC CE signaling at a MAC layer, where the MAC CE signaling includes the instruction information used for activating the secondary cell, the MAC layer packages and sends the MAC CE signaling to a physical layer, and the physical layer transmits the MAC CE signaling on a PDSCH.

After receiving physical layer information sent by the network-side device, the terminal performs processes such as channel estimation, equalization, or decoding, to correctly receive the physical layer information.

Step 52: The terminal sends acknowledgement (ACK) signaling, where the acknowledgement signaling is used for confirming reception of the MAC CE signaling.

After correctly receiving the physical layer information sent by the network-side device, the terminal sends the ACK signaling to the network-side device.

Step 53: The terminal receives downlink control information (DCI), where the downlink control information includes information used for triggering the aperiodic tracking reference signal in the secondary cell, and a receiving moment of the downlink control information (DCI trigger timing) is after a sending moment of the acknowledgement signaling.

For example, the network-side device corresponding to the primary cell sends the downlink control information to the terminal based on the sending moment of the downlink control information. The terminal blindly detects and receives the downlink control information.

In some embodiments of this disclosure, the terminal does not expect to receive the downlink control information before the sending moment of the acknowledgement signaling. If the terminal receives the downlink control information before the sending moment of the acknowledgement signaling, it is determined that the received aperiodic tracking reference signal is invalid. If the terminal receives the downlink control information after the sending moment of the acknowledgement signaling, it is determined that the received aperiodic tracking reference signal is valid.

Step 54: After the MAC CE signaling becomes valid (MAC CE message is applied), the terminal starts to activate the secondary cell.

The protocol stipulates that there is 3 ms between sending of ACK signaling by the terminal and a validation time of the MAC CE signaling. After the MAC CE signaling becomes valid, the secondary cell starts to be activated, that is, the terminal starts radio frequency retuning with the secondary cell.

Step 55: The terminal completes radio frequency retuning with the secondary cell.

Step 56: The terminal receives the aperiodic tracking reference signal in the secondary cell based on the received downlink control information and the time offset between the receiving moment of the downlink control information and the receiving moment of the aperiodic tracking reference signal.

Step 57: The terminal determines whether a validation condition of the aperiodic tracking reference signal is met. If yes, proceed to step 58; otherwise, proceed to step 59. The validation condition includes that the receiving moment of the downlink control information (DCI trigger timing) is after the sending moment of the acknowledgement signaling, and that the receiving moment of the aperiodic tracking reference signal is after completion of radio frequency retuning between the terminal and the secondary cell.

Step 58: If the validation condition of the aperiodic tracking reference signal is met, determine that the aperiodic tracking reference signal is valid.

Step 59: If the validation condition of the aperiodic tracking reference signal is not met, determine that the aperiodic tracking reference signal is invalid.

EXAMPLE 3

Figure 6:
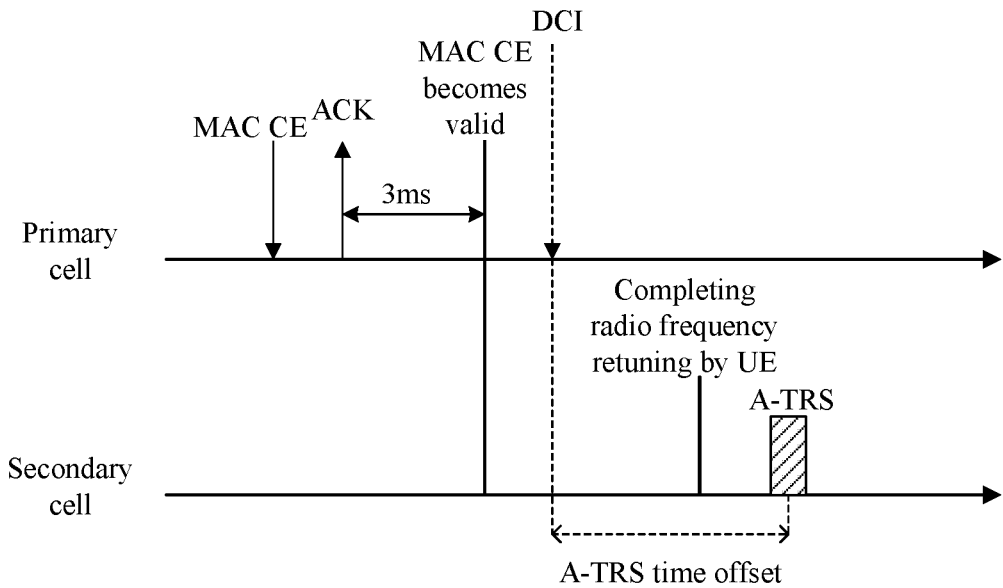
FIG. 6 is a schematic flowchart 3 of a receiving moment of an aperiodic tracking reference signal according to this disclosure.

Referring to FIG. 6, the method of receiving an aperiodic tracking reference signal in Example 3 of this disclosure includes the following steps.

Step 61: The terminal receives MAC CE signaling (activation Command) in a primary cell, where the MAC CE signaling includes instruction information used for activating a secondary cell.

On a network-side device corresponding to the primary cell, the network-side device generates the MAC CE signaling at a MAC layer, where the MAC CE signaling includes the instruction information used for activating the secondary cell, the MAC layer packages and sends the MAC CE signaling to a physical layer, and the physical layer transmits the MAC CE signaling on a PDSCH.

After receiving physical layer information sent by the network-side device, the terminal performs processes such as channel estimation, equalization, or decoding, to correctly receive the physical layer information.

Step 62: The terminal sends acknowledgement (ACK) signaling, where the acknowledgement signaling is used for confirming reception of the MAC CE signaling.

After correctly receiving the physical layer information sent by the network-side device, the terminal sends the ACK signaling to the network-side device.

Step 63: After the MAC CE signaling becomes valid (MAC CE message is applied), the terminal starts to activate the secondary cell.

The protocol stipulates that there is 3 ms between sending of ACK signaling by the terminal and a validation time of the MAC CE signaling. After the MAC CE signaling becomes valid, the secondary cell starts to be activated, that is, the terminal starts radio frequency retuning with the secondary cell.

Step 64: The terminal receives downlink control information (DCI), where the downlink control information includes information used for triggering the aperiodic tracking reference signal in the secondary cell, and a receiving moment of the downlink control information (DCI trigger timing) is after a sending moment of the acknowledgement signaling.

For example, the network-side device corresponding to the primary cell sends the downlink control information to the terminal based on the sending moment of the downlink control information. The terminal blindly detects and receives the downlink control information.

In some embodiments of this disclosure, the terminal does not expect to receive the downlink control information before a validation moment of the MAC CE signaling. If the terminal receives the downlink control information before the validation moment of the MAC CE signaling, it is determined that the received aperiodic tracking reference signal is invalid. If the terminal receives the downlink control information after the validation moment of the MAC CE signaling, it is determined that the received aperiodic tracking reference signal is valid.

Step 65: The terminal completes radio frequency retuning with the secondary cell.

Step 66: The terminal receives the aperiodic tracking reference signal in the secondary cell based on the received downlink control information and the time offset between the receiving moment of the downlink control information and the receiving moment of the aperiodic tracking reference signal.

Step 67: The terminal determines whether a validation condition of the aperiodic tracking reference signal is met. If yes, proceed to step 68; otherwise, proceed to step 69. The validation condition includes that the receiving moment of the downlink control information (DCI trigger timing) is after the validation moment of the MAC CE signaling, and that the receiving moment of the aperiodic tracking reference signal is after completion of radio frequency retuning between the terminal and the secondary cell.

Step 68: If the validation condition of the aperiodic tracking reference signal is met, determine that the aperiodic tracking reference signal is valid.

Step 69: If the validation condition of the aperiodic tracking reference signal is not met, determine that the aperiodic tracking reference signal is invalid.

EXAMPLE 4

Figure 7:
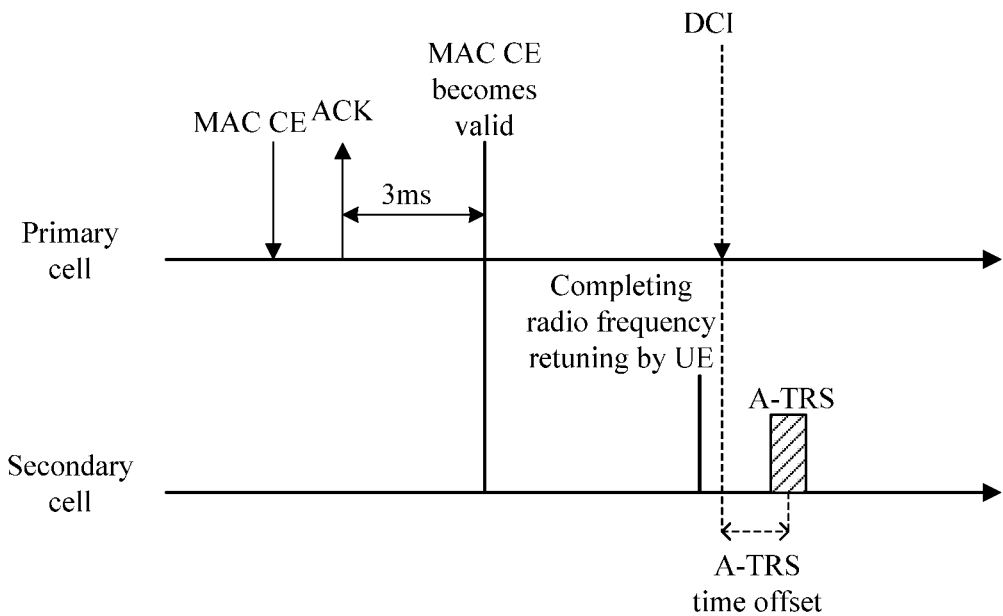
FIG. 7 is a schematic flowchart 4 of a receiving moment of an aperiodic tracking reference signal according to this disclosure.

Referring to FIG. 7, the method of receiving an aperiodic tracking reference signal in Example 4 of this disclosure includes the following steps.

Step 71: The terminal receives MAC CE signaling (activation Command) in a primary cell, where the MAC CE signaling includes instruction information used for activating a secondary cell.

On a network-side device corresponding to the primary cell, the network-side device generates the MAC CE signaling at a MAC layer, where the MAC CE signaling includes the instruction information used for activating the secondary cell, the MAC layer packages and sends the MAC CE signaling to a physical layer, and the physical layer transmits the MAC CE signaling on a PDSCH.

After receiving physical layer information sent by the network-side device, the terminal performs processes such as channel estimation, equalization, or decoding, to correctly receive the physical layer information.

Step 72: The terminal sends acknowledgement (ACK) signaling, where the acknowledgement signaling is used for confirming reception of the MAC CE signaling.

After correctly receiving the physical layer information sent by the network-side device, the terminal sends the ACK signaling to the network-side device.

Step 73: After the MAC CE signaling becomes valid (MAC CE message is applied), the terminal starts to activate the secondary cell.

The protocol stipulates that there is 3 ms between sending of ACK signaling by the terminal and a validation time of the MAC CE signaling. After the MAC CE signaling becomes valid, the secondary cell starts to be activated, that is, the terminal starts radio frequency retuning with the secondary cell.

Step 74: The terminal completes radio frequency retuning with the secondary cell.

Step 75: The terminal receives downlink control information (DCI), where the downlink control information includes information used for triggering the aperiodic tracking reference signal in the secondary cell, and a receiving moment of the downlink control information (DCI trigger timing) is after a sending moment of the acknowledgement signaling.

For example, the network-side device corresponding to the primary cell sends the downlink control information to the terminal based on the sending moment of the downlink control information. The terminal blindly detects and receives the downlink control information.

In some embodiments of this disclosure, the terminal does not expect to receive the downlink control information before a completion moment of radio frequency retuning between the terminal and the secondary cell. If the terminal receives the downlink control information before the completion moment of radio frequency retuning between the terminal and the secondary cell, it is determined that the received aperiodic tracking reference signal is invalid. If the terminal receives the downlink control information after the completion moment of radio frequency retuning between the terminal and the secondary cell, it is determined that the received aperiodic tracking reference signal is valid.

Step 76: The terminal receives the aperiodic tracking reference signal in the secondary cell based on the received downlink control information and the time offset between the receiving moment of the downlink control information and the receiving moment of the aperiodic tracking reference signal.

Step 77: The terminal determines whether a validation condition of the aperiodic tracking reference signal is met. If yes, proceed to step 78; otherwise, proceed to step 79. The validation condition includes that the receiving moment of the downlink control information (DCI trigger timing) is after the completion moment of radio frequency retuning between the terminal and the secondary cell, and that the receiving moment of the aperiodic tracking reference signal is after the completion moment of radio frequency retuning between the terminal and the secondary cell.

Step 78: If the validation condition of the aperiodic tracking reference signal is met, determine that the aperiodic tracking reference signal is valid.

Step 79: If the validation condition of the aperiodic tracking reference signal is not met, determine that the aperiodic tracking reference signal is invalid.

EXAMPLE 5

Figure 8:
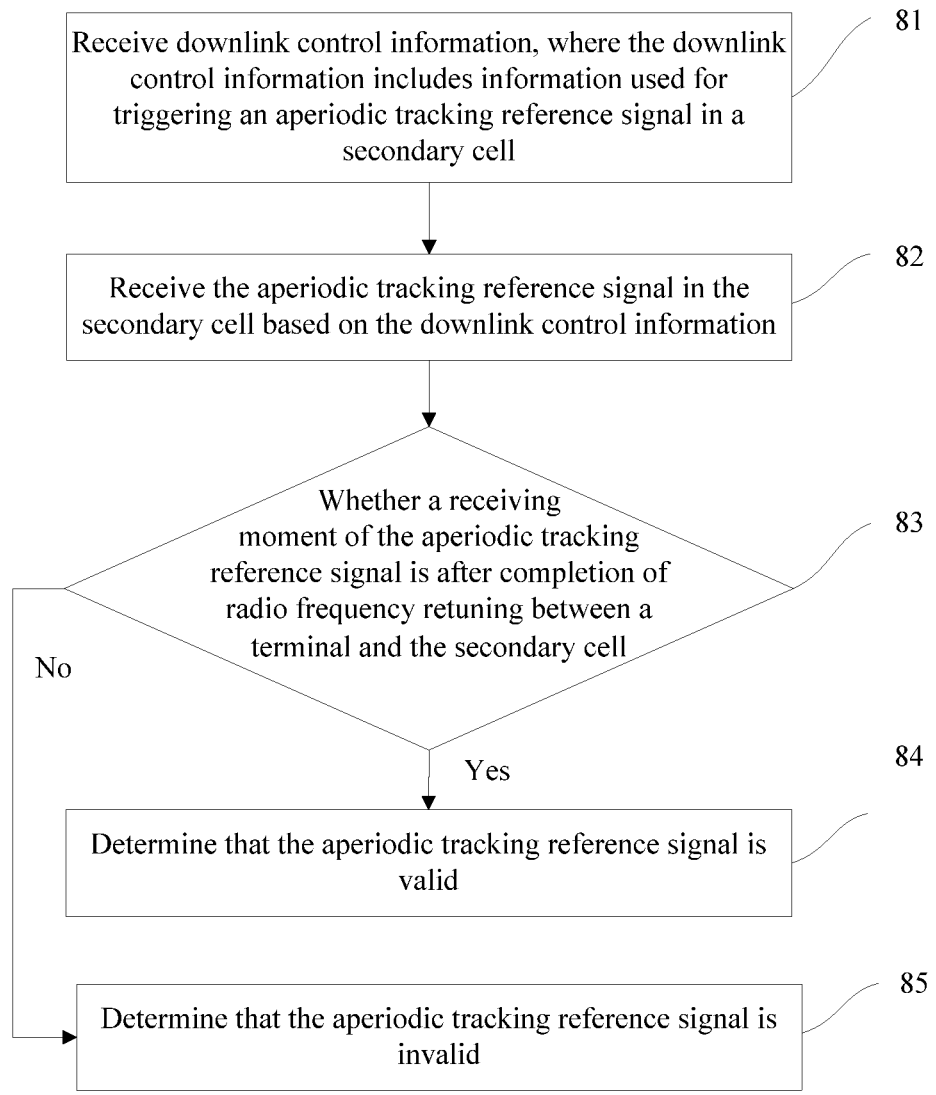
FIG. 8 is a schematic flowchart of a method for receiving an aperiodic tracking reference signal according to this disclosure.

Referring to FIG. 8, the method of receiving an aperiodic tracking reference signal in Example 5 of this disclosure includes the following steps.

Step 81: Receive downlink control information, where the downlink control information includes information used for triggering the aperiodic tracking reference signal in the secondary cell.

Step 82: Receive the aperiodic tracking reference signal in the secondary cell based on the downlink control information.

Step 83: Determine whether a receiving moment of the aperiodic tracking reference signal is after completion of radio frequency retuning between the terminal and the secondary cell; if yes, determine that a validation condition of the aperiodic tracking reference signal is met, and proceed to step 84; otherwise, determine that the validation condition of the aperiodic tracking reference signal is not met, and proceed to step 85.

Step 84: If the validation condition of the aperiodic tracking reference signal is met, determine that the aperiodic tracking reference signal is valid.

Step 85: If the validation condition of the aperiodic tracking reference signal is not met, determine that the aperiodic tracking reference signal is invalid.

In some embodiments of this disclosure, the validation condition of the aperiodic tracking reference signal is not related to a receiving moment of the downlink control information, but only related to the receiving moment of the aperiodic tracking reference signal. That is, if the terminal receives the aperiodic tracking reference signal before completing radio frequency retuning with the secondary cell, it is determined that the received aperiodic tracking reference signal is invalid. If the terminal receives the aperiodic tracking reference signal after completing radio frequency retuning with the secondary cell, it is determined that the received aperiodic tracking reference signal is valid.

In addition, in some embodiments of this disclosure, the receiving moment of the downlink control information is not limited; however, after receiving the downlink control information, the terminal does not perform any operation on the secondary cell based on the downlink control information, such as a handover to the secondary cell or radio frequency retuning of the secondary cell.

Figure 9:
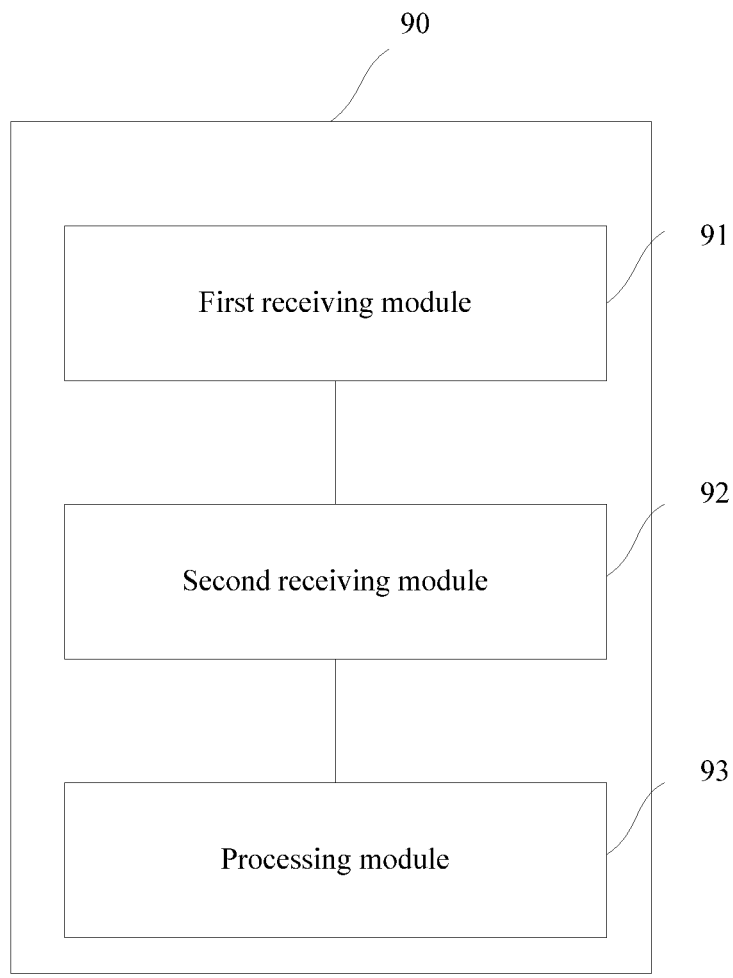
FIG. 9 is a schematic structural diagram of a terminal according to this disclosure.

Based on the same inventive concept, referring to FIG. 9, some embodiments of this disclosure further provide a terminal 90, including:

a first receiving module 91, configured to receive downlink control information, where the downlink control information includes information used for triggering an aperiodic tracking reference signal in a secondary cell;

a second receiving module 92, configured to receive the aperiodic tracking reference signal in the secondary cell based on the downlink control information; and a processing module 93, configured to: if a validation condition of the aperiodic tracking reference signal is met, determine that the aperiodic tracking reference signal is valid, where the validation condition includes at least that a receiving moment of the aperiodic tracking reference signal is after completion of radio frequency retuning between the terminal and the secondary cell.

Optionally, the validation condition further includes that a receiving moment of the downlink control information is after a preset moment.

Optionally, the preset moment is one of the following moments:

a receiving moment of MAC CE signaling, where the MAC CE signaling includes an instruction used for activating the secondary cell;

a sending moment of acknowledgement signaling, where the acknowledgement signaling is used for confirming reception of the MAC CE signaling;

a validation moment of the MAC CE signaling; and a completion moment of radio frequency retuning between the terminal and the secondary cell.

Optionally, the terminal further includes:

a third receiving module, configured to receive configuration information, where the configuration information includes at least time offset information between the receiving moment of the downlink control information and the receiving moment of the aperiodic tracking reference signal.

The second receiving module is further configured to: determine the receiving moment of the aperiodic tracking reference signal based on the receiving moment of the downlink control information and the time offset information; and receive the aperiodic tracking reference signal in the secondary cell at the determined receiving moment.

The terminal provided in some embodiments of this disclosure is capable of implementing processes that are implemented by the terminal in the method embodiments of FIG. 1 to FIG. 7. To avoid repetition, details are not described herein again.

Figure 10:
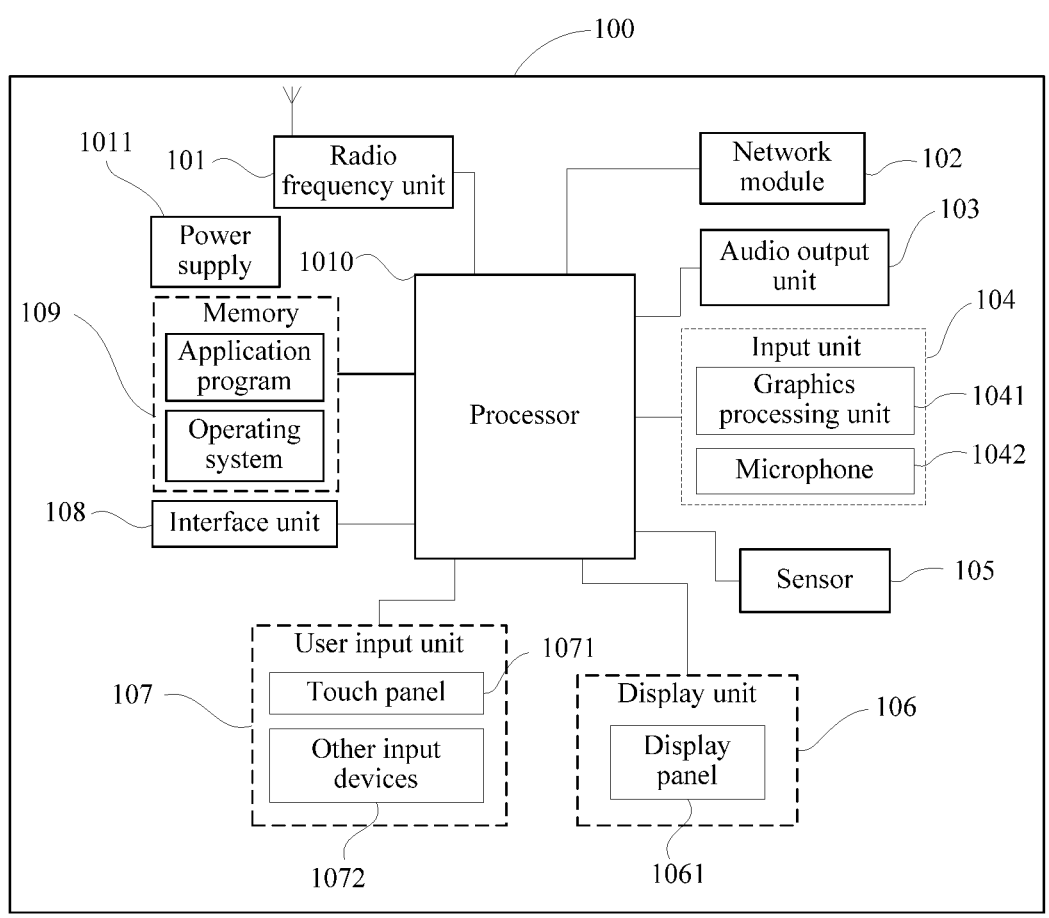
FIG. 10 is a schematic structural diagram 2 of a terminal according to this disclosure.

FIG. 10 is a schematic structural diagram of a terminal according to another embodiment of this disclosure. The terminal 100 includes but is not limited to components such as a radio frequency unit 101, a network module 102, an audio output unit 103, an input unit 104, a sensor 105, a display unit 106, a user input unit 107, an interface unit 108, a memory 109, a processor 1010, and a power supply 1011. Persons skilled in the art can understand that a structure of the terminal shown in FIG. 10 does not constitute any limitation on the terminal, and the terminal may include more or fewer components than those shown in the figure, or a combination of some components, or the components disposed differently. In some embodiments of this disclosure, the terminal includes but is not limited to a mobile phone, a tablet computer, a laptop computer, a palmtop computer, an in-vehicle terminal, a wearable device, a pedometer, and the like.

The radio frequency unit 101 is configured to receive downlink control information, and receive an aperiodic tracking reference signal in a secondary cell based on the downlink control information, where the downlink control information includes information used for triggering the aperiodic tracking reference signal in the secondary cell.

The processor 1010 is configured to: if a validation condition of the aperiodic tracking reference signal is met, determine that the aperiodic tracking reference signal is valid, where the validation condition includes at least that a receiving moment of the aperiodic tracking reference signal is after completion of radio frequency retuning between the terminal and the secondary cell.

In some embodiments of this disclosure, the aperiodic tracking reference signal is used to perform time-frequency tracking on the secondary cell. The aperiodic tracking reference signal can be triggered based on a requirement, which resolves a problem of poor flexibility of a periodic tracking reference signal. In addition, a receiving moment of a usable aperiodic tracking reference signal is definite, so that time-frequency tracking on the secondary cell can be performed based on the usable aperiodic tracking reference signal, which improves communication accuracy and efficiency. It should be understood that in some embodiments of this disclosure, the radio frequency unit 101 may be configured to: receive and send signals in an information receiving/sending process or a call process; and specifically, after receiving downlink data from a base station, send the downlink information to the processor 1010 for processing, and in addition, send uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and another device through a wireless communications system.

The terminal provides a user with wireless broadband internet access through the network module 102, for example, helping the user to send or receive an e-mail, to browse a web page, or to access streaming media.

The audio output unit 103 may convert audio data that is received by the radio frequency unit 101 or the network module 102 or stored in the memory 109 into an audio signal and output the audio signal as a sound. Furthermore, the audio output unit 103 may also provide audio output (for example, a call signal received sound or a message received sound) related to a specific function performed by the terminal 100.

The audio output unit 103 includes a speaker, a buzzer, a telephone receiver, and the like.

The input unit 104 is configured to receive an audio or video signal. The input unit 104 may include a graphics processing unit (GPU) 1041 and a microphone 1042, and the graphics processing unit 1041 processes image data of a still picture or a video obtained by an image capture apparatus (for example, a camera) in an image capture mode or a video capture mode. A processed image frame may be displayed on the display unit 106. An image frame processed by the graphics processing unit 1041 may be stored in the memory 109 (or another storage medium) or sent by the radio frequency unit 101 or the network module 102. The microphone 1042 can receive a sound and can process the sound into audio data. The processed audio data can be converted into a format that can be sent to a mobile communication base station through the radio frequency unit 101 in a telephone call mode, for outputting.

The terminal 100 may further include at least one sensor 105, such as a light sensor, a motion sensor, and other sensors. Specifically, the light sensor may include an ambient light sensor and a proximity sensor. The ambient light sensor may adjust luminance of the display panel 1061 based on brightness of ambient light, and the proximity sensor may turn off the display panel 1061 and/or backlight when the terminal 100 moves close to an ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided for the user. The display unit 106 may include a display panel 1061, and the display panel 1061 may be configured in a form of a liquid crystal display (LCD), an organic light-emitting diode (OLED), or the like.

The user input unit 107 may be configured to receive input digit or character information and generate key signal input related to user setting and function control of the terminal. Specifically, the user input unit 107 includes a touch panel 1071 and other input devices 1072. The touch panel 1071, also referred to as a touchscreen, may capture a touch operation performed by the user on or near the touch panel (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1010, and receives and executes a command sent by the processor 1010. In addition, the touch panel 1071 may be implemented in a plurality of forms, for example, as a resistive, capacitive, infrared, or surface acoustic wave touch panel. The user input unit 107 may further include other input devices 1072 in addition to the touch panel 1071. Specifically, the other input devices 1072 may include but are not limited to a physical keyboard, a function key (such as a volume control key or a power on/off key), a trackball, a mouse, a joystick, and the like. Details are not described herein.

Further, the touch panel 1071 may cover the display panel 1061. After detecting a touch operation on or near the touch panel 1071, the touch panel 1071 transmits information about the touch operation to the processor 1010 for the processor 1010 to determine a touch event type, and then the processor 1010 provides a corresponding visual output on the display panel 1061 based on the touch event type. Although in FIG. 10, the touch panel 1071 and the display panel 1061 act as two independent parts to implement input and output functions of the terminal, in some embodiments, the touch panel 1071 and the display panel 1061 may be integrated to implement the input and output functions of the terminal. This is not specifically limited herein.

The interface unit 108 is an interface between an external apparatus and the terminal 100. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 108 may be configured to: receive input (for example, data information and power) from the external apparatus, and transmit the received input to one or more elements in the terminal 100, or may be configured to transmit data between the terminal 100 and the external apparatus.

The memory 109 may be configured to store a software program and various data. The memory 109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 109 may include a high-speed random access memory, or may include a non-volatile memory, for example, at least one magnetic disk storage device, a flash memory device, or other volatile solid-state storage devices.

The processor 1010 is a control center of the terminal, and is connected to all components of the terminal by using various interfaces and lines. By running or executing a software program and/or module that is stored in the memory 109 and calling data stored in the memory 109, the processor 1010 executes various functions of the terminal and processes data, so as to perform overall monitoring on the terminal. The processor 1010 may include one or more processing units. Optionally, an application processor and a modem processor may be integrated into the processor 1010. The application processor mainly processes an operating system, a user interface, an application program, and the like. The modem processor mainly processes wireless communication. It may be understood that the modem processor may alternatively not be integrated into the processor 1010.

The terminal 100 may further include a power supply 1011 (such as a battery) that supplies power to components. Optionally, the power supply 1011 may be logically connected to the processor 1010 through a power management system. In this way, functions such as charge management, discharge management, and power consumption management are implemented by using the power management system.

In addition, the terminal 100 includes some functional modules that are not shown. Details are not described herein.

Figure 11:
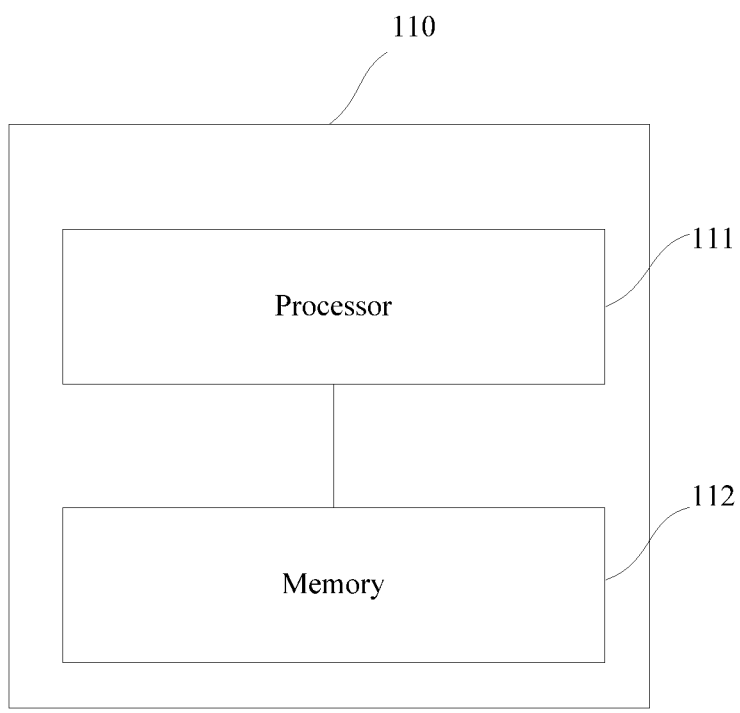
FIG. 11 is a schematic structural diagram 3 of a terminal according to this disclosure.

FIG. 11 is a schematic structural diagram of a terminal according to still another embodiment of this disclosure. The terminal 110 includes a processor 111 and a memory 112. In some embodiments of this disclosure, the terminal 110 further includes a computer program stored in the memory 112 and capable of running on the processor 111. When the computer program is executed by the processor 111, the following steps are implemented:

receiving downlink control information, where the downlink control information includes information used for triggering an aperiodic tracking reference signal in a secondary cell;

receiving the aperiodic tracking reference signal in the secondary cell based on the downlink control information; and if a validation condition of the aperiodic tracking reference signal is met, determining that the aperiodic tracking reference signal is valid, where the validation condition includes at least that a receiving moment of the aperiodic tracking reference signal is after completion of radio frequency retuning between the terminal and the secondary cell.

The processor 111 is responsible for management of the bus architecture and general processing, and the memory 112 is capable of storing data that is used by the processor 111 during operation.

Optionally, the validation condition further includes that the receiving moment of the downlink control information is after a preset moment.

Optionally, the preset moment is one of the following moments:

a receiving moment of media access control layer control element (MAC CE) signaling, where the MAC CE signaling includes an instruction used for activating the secondary cell;

a sending moment of acknowledgement signaling, where the acknowledgement signaling is used for confirming reception of the MAC CE signaling;

a validation moment of the MAC CE signaling; and a completion moment of radio frequency retuning between the terminal and the secondary cell.

Optionally, when the computer program is executed by the processor 111, the following step is further implemented. Before the step of receiving downlink control information, the following step is further included:

receiving configuration information, where the configuration information includes at least time offset information between a receiving moment of the downlink control information and the receiving moment of the aperiodic tracking reference signal.

The step of receiving the aperiodic tracking reference signal in the secondary cell based on the downlink control information includes:

determining the receiving moment of the aperiodic tracking reference signal based on the receiving moment of the downlink control information and the time offset information; and receiving the aperiodic tracking reference signal in the secondary cell at the determined receiving moment.

An embodiment of this disclosure further provides a computer-readable storage medium, where a computer program is stored in the computer-readable storage medium. When the computer program is executed by a processor, processes of the foregoing method embodiments of receiving an aperiodic tracking reference signal are implemented and can achieve a same technical effect. To avoid repetition, details are not described herein again. The computer-readable storage medium may be a volatile computer-readable storage medium or a non-volatile computer-readable storage medium, such as a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or the part contributing to the related art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing embodiments are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A method for receiving an aperiodic tracking reference signal, applied to a terminal, wherein the method comprises:

receiving downlink control information, wherein the downlink control information comprises information used for triggering an aperiodic tracking reference signal in a secondary cell, and the aperiodic tracking reference signal in the secondary cell is triggered by a Channel State Information (CSI) request field in the downlink control information;

receiving the aperiodic tracking reference signal in the secondary cell based on the downlink control information; and when a validation condition of the aperiodic tracking reference signal is met, determining that the aperiodic tracking reference signal is valid, wherein the validation condition comprises at least that a receiving moment of the aperiodic tracking reference signal is after completion of radio frequency retuning between the terminal and the secondary cell.

2. The method for receiving an aperiodic tracking reference signal according to claim 1, wherein the validation condition further comprises that a receiving moment of the downlink control information is after a preset moment.

3. The method for receiving an aperiodic tracking reference signal according to claim 2, wherein the preset moment is one of the following moments:

a receiving moment of media access control layer control element (MAC CE) signaling, wherein the MAC CE signaling comprises an instruction used for activating the secondary cell;

a sending moment of acknowledgement signaling, wherein the acknowledgement signaling is used for confirming reception of the MAC CE signaling;

a validation moment of the MAC CE signaling; and a completion moment of radio frequency retuning between the terminal and the secondary cell.

4. The method for receiving an aperiodic tracking reference signal according to claim 1, wherein before the step of receiving downlink control information, the method further comprises:

receiving configuration information, wherein the configuration information comprises at least time offset information between a receiving moment of the downlink control information and the receiving moment of the aperiodic tracking reference signal.

5. The method for receiving an aperiodic tracking reference signal according to claim 4, wherein the step of receiving the aperiodic tracking reference signal in the secondary cell based on the downlink control information comprises:
determining the receiving moment of the aperiodic tracking reference signal based on the receiving moment of the downlink control information and the time offset information; and
receiving the aperiodic tracking reference signal in the secondary cell at the determined receiving moment.

6. A terminal, comprising:
a processor, a memory, and a computer program stored in the memory and capable of running on the processor, wherein when the computer program is executed by the processor, the processor implements:
receiving downlink control information, wherein the downlink control information comprises information used for triggering an aperiodic tracking reference signal in a secondary cell, and the aperiodic tracking reference signal in the secondary cell is triggered by a Channel State Information (CSI) request field in the downlink control information;
receiving the aperiodic tracking reference signal in the secondary cell based on the downlink control information; and
when a validation condition of the aperiodic tracking reference signal is met, determining that the aperiodic tracking reference signal is valid, wherein the validation condition comprises at least that a receiving moment of the aperiodic tracking reference signal is after completion of radio frequency retuning between the terminal and the secondary cell.

7. The terminal according to claim 6, wherein the validation condition further comprises that a receiving moment of the downlink control information is after a preset moment.

8. The terminal according to claim 7, wherein the preset moment is one of the following moments:
a receiving moment of media access control layer control element (MAC CE) signaling, wherein the MAC CE signaling comprises an instruction used for activating the secondary cell;
a sending moment of acknowledgement signaling, wherein the acknowledgement signaling is used for confirming reception of the MAC CE signaling;
a validation moment of the MAC CE signaling; and
a completion moment of radio frequency retuning between the terminal and the secondary cell.

9. The terminal according to claim 6, wherein before the step of receiving downlink control information, the processor further implements:
receiving configuration information, wherein the configuration information comprises at least time offset information between a receiving moment of the downlink control information and the receiving moment of the aperiodic tracking reference signal.

10. The terminal according to claim 9, the processor further implements:
determining the receiving moment of the aperiodic tracking reference signal based on the receiving moment of the downlink control information and the time offset information; and receiving the aperiodic tracking reference signal in the secondary cell at the determined receiving moment.

11. A non-transitory computer-readable storage medium, wherein the non-transitory computer-readable storage medium stores a computer program, and when the computer program is executed by a processor, the processor implements
receiving downlink control information, wherein the downlink control information comprises information used for triggering an aperiodic tracking reference signal in a secondary cell, and the aperiodic tracking reference signal in the secondary cell is triggered by a Channel State Information (CSI) request field in the downlink control information;
receiving the aperiodic tracking reference signal in the secondary cell based on the downlink control information; and
when a validation condition of the aperiodic tracking reference signal is met, determining that the aperiodic tracking reference signal is valid, wherein the validation condition comprises at least that a receiving moment of the aperiodic tracking reference signal is after completion of radio frequency retuning between the terminal and the secondary cell.

12. The non-transitory computer-readable storage medium according to claim 11, wherein the validation condition further comprises that a receiving moment of the downlink control information is after a preset moment.

13. The non-transitory computer-readable storage medium according to claim 12, wherein the preset moment is one of the following moments:
a receiving moment of media access control layer control element (MAC CE) signaling, wherein the MAC CE signaling comprises an instruction used for activating the secondary cell;
a sending moment of acknowledgement signaling, wherein the acknowledgement signaling is used for confirming reception of the MAC CE signaling;
a validation moment of the MAC CE signaling; and
a completion moment of radio frequency retuning between the terminal and the secondary cell.

14. The non-transitory computer-readable storage medium according to claim 11, wherein before the step of receiving downlink control information, the processor further implements:
receiving configuration information, wherein the configuration information comprises at least time offset information between a receiving moment of the downlink control information and the receiving moment of the aperiodic tracking reference signal.

15. The non-transitory computer-readable storage medium according to claim 14, wherein the processor further implements:
determining the receiving moment of the aperiodic tracking reference signal based on the receiving moment of the downlink control information and the time offset information; and
receiving the aperiodic tracking reference signal in the secondary cell at the determined receiving moment.

* * * * *